United States Patent [19]
Blinn et al.

[11] Patent Number: 5,974,418
[45] Date of Patent: Oct. 26, 1999

[54] DATABASE SCHEMA INDEPENDENCE

[76] Inventors: Arnold Blinn, 9401 NE. 27th St., Bellevue, Wash. 98004; Michael Ari Cohen, 4318 17th St., Apt. B, San Francisco, Calif. 94114; Michael Lorton, 15853 NE. 83rd Way, Redmond, Wash. 98052; Gregory J. Stein, 18625 NE. 139th St., Redmond, Wash. 98072

[ * ] Notice: This patent issued on a continued prosecution application filed under 37 CFR 1.53(d), and is subject to the twenty year patent term provisions of 35 U.S.C. 154(a)(2).

[21] Appl. No.: 08/732,013

[22] Filed: Oct. 16, 1996

[51] Int. Cl.$^6$ .................................................. G06F 17/30
[52] U.S. Cl. ............................. 707/100; 707/4; 707/10; 707/102; 705/26
[58] Field of Search ........................... 707/10, 100–102, 707/1–3, 4; 705/26

[56] References Cited

U.S. PATENT DOCUMENTS

| | | | |
|---|---|---|---|
| 5,235,701 | 8/1993 | Ohler et al. ................................. | 707/1 |
| 5,491,818 | 2/1996 | Malatesta et al. ....................... | 707/201 |
| 5,513,348 | 4/1996 | Rye et al. .................................... | 707/1 |
| 5,596,744 | 1/1997 | Dao et al. ................................... | 707/10 |
| 5,615,367 | 3/1997 | Bennett et al. .......................... | 707/102 |
| 5,659,724 | 8/1997 | Borgida et al. ............................. | 707/3 |
| 5,692,181 | 11/1997 | Anand et al. ............................ | 707/102 |
| 5,701,453 | 12/1997 | Maloney et al. .............................. | 707/2 |
| 5,764,973 | 6/1998 | Lunceford et al. ......................... | 707/1 |

OTHER PUBLICATIONS eShop Technology overview, Internet address: http://www.e-shop.com/corp/technology.html. This reference was copied from the Internet and printed in or about May 1996; the pages are dated Jan. 1, 1996.

eShop In The News—Recent Press Release, Internet address: http://www.eshop.com/corp/press.html. This reference was copied from the Internet and printed in or about May 1996; the pages are dated Jan. 1, 1996. Dates are listed for press releases of Nov. 7, 1995, Dec. 7, 1995 and Jan. 23, 1996.

*eShop™ Technology Merchant Manual,* Feb. 21, 1996. This document contains proprietary material subject to M.P.E.P. § 724.

*Primary Examiner*—Thomas G. Black
*Assistant Examiner*—Hosain T. Alam
*Attorney, Agent, or Firm*—Lee & Hayes, PLLC

[57] ABSTRACT

An application, such as an online merchant system, provides a name for a query stored in a database. The database accesses the query using the name provided by the application. The database next executes the query to produce an access object having the query results. The application then processes the access object to obtain a selected result. Storing queries in the database provides a level of indirection and flexibility enabling applications to access databases without prior knowledge of their schemas. Thus, applications can access data in a wide variety of existing databases having different schemas and data sublanguages. Modification of the database schema does not require corresponding modification or recompilation of the application accessing the database.

21 Claims, 12 Drawing Sheets

Query_table 120

| NAME | SQL_TEXT |
|---|---|
| fetchproducts | select * from products |
| fetchdept | select * from dept |

FIG. 3

```
<BODY>
<H1>Welcome. Here are the departments</H1>
[tfetchrows dao Dept]
[eachrow dao]
<li>The Department is [value dao.name]
[/eachrow]
```

| DEPT | NAME | DESRIPTION | DEPARTMENT ID |
|---|---|---|---|
| | Pants | Pants in all sizes | 0 |
| | Shirts | Shirt in all sizes | 1 |
| | Shoes | Shoes of all forms | 2 |

FIG. 8B

```
Name          String
Description   String
Department Id Number
```

| Pants | Pants in all sizes | 0 |
| Shirts | Shirts in all sizes | 1 |
| Shoes | Shoes of all forms | 2 |

```
Sku          Number
Name         String
Description  String
Price        Number
Sale_price   Number
Sale_start   Date
Sale_end     Date
```

| | | | | | | |
|---|---|---|---|---|---|---|
| 1 | Best of Abba | CD-Abba | 11.99 | 10.99 | 8/20/96 | 9/20/96 |

FIG. 11

DATABASE SCHEMA INDEPENDENCE

BACKGROUND OF THE INVENTION

1. Field of the Invention

The present invention relates to electronic databases and, more specifically, to a method of obtaining data from a database that is independent of its schema.

2. Description of the Related Technology

In the most general sense, a database is a collection of data. Various architectures have been devised to organize data in a computerized database. Typically, a computerized database includes data stored in mass storage devices, such as tape drives, magnetic hard disk drives and optical drives. The three principle architectures are termed hierarchical, network and relational. A hierarchical database, such as the IMS product from IBM, assigns different data types to different levels of the hierarchy. Links between data items on one level and data items on a different level are simple and direct. However, a single data item can appear multiple times in a hierarchical database and this creates data redundancy. To eliminate data redundancy, a network database, such as that proposed by the Committee for Data System Languages, stores data in nodes having direct access to any other node in the database. There is no need to duplicate data since all nodes are universally accessible. Lastly, in a relational database, the basic unit of data is a relation. A relation comprises attributes and tuples.

In an implementation of a relational database, a relation corresponds to a table having rows, where each row corresponds to a tuple, and columns, where each column corresponds to an attribute. From a practical standpoint, rows represent records of related data and columns identify individual data elements. A table defining a retailer's product line may, for example, have product names, product numbers (e.g., Stock Keeping Units or SKUs) and prices. Each row of this table holds data for a single product and each column holds a single attribute, such as a product name. The order in which the rows and columns appear in a table has no significance. In a relational database, one can add a new column to a table without having to modify older applications that access other columns in the table. Relational databases thus provide flexibility to accommodate changing needs.

All databases require a consistent structure, termed a schema, to organize and manage the information. In a relational database, the schema is a collection of tables. Similarly, for each table, there is generally one schema to which it belongs. Once the schema is designed, a tool, known as a database management system (DBMS), is used to build the database and to operate on data within the database. The DBMS stores, retrieves and modifies data associated with the database. Lastly, to the extent possible, the DBMS protects data from corruption and unauthorized access.

A human user controls the DBMS by providing a sequence of commands selected from a data sublanguage. The syntax of data sublanguages varies widely, including, for example, QUEL (Ingres Corporation), RDML (Digital Equipment Corporation) and SQL/DS (BDM). Fortunately, the American National Standards Institute (ANSI) and the International Organization for Standardization (ISO) have adopted Structured English Query Language (SQL) as a standard data sublanguage for relational databases. The current version of the SQL standard is SQL-92 (ANSI Document No. X3.135-1992). SQL comprises a data definition language (DDL), a data manipulation language (DML), and a data control language (DCL). DDL allows users to define a database, to modify its structure and to destroy it. DML provides the tools to enter, modify and extract data from the database. DCL provides tools to protect data from corruption and unauthorized access. Although SQL is standardized, most implementations of the ANSI standard have subtle differences. Nonetheless, the standardization of SQL has greatly increased the utility of relational databases for many applications, including retail sales and merchandising operations, which are of particular interest to the present invention.

Although access to relational databases is facilitated by standard data sublanguages, users still must have detailed knowledge of the schema to obtain needed information from a database since one can design many different schemas to represent the storage of a given collection of information. For example, in an electronic merchandising system, a merchant may elect to store product information, such as product SKU, product name, product description, price, and tax code, in a single table within a relational database. Another merchant may elect to store product SKU, product name, description, and tax code in one table while product SKU and product price are stored in a separate table. In this situation, a SQL query designed to retrieve a product price from one merchant's database is not useful for retrieving the price for the same product in the other merchant's database because the differences in schemas require the use of different SQL queries to retrieve product price. As a consequence, developers of retail applications accessing product information from relational databases have to adapt their SQL queries to each individual schema. This, in turn, prevents their applications from being used in environments where there are a wide variety of databases having different schemas, such as the World Wide Web.

The rapid development of the World Wide Web (Web) facilitates the use of online merchant systems. Online merchant systems enable merchants to creatively display and describe their products to a global audience of shoppers using Web pages defined by hypertext markup language (HTML). HTML enables merchants to layout and display content, such as text, pictures, sound and video. Web shoppers access a merchant's page using a browser, such as Microsoft Explorer or Netscape Navigator, installed on a client connected to the Web through an online service provider, such as the Microsoft Network or America OnLine. The browser interprets the HTML to format and display the merchants page for the shopper. The online merchant system likewise enables shoppers to browse through a merchant's store to identify products of interest, to obtain specific product information and to electronically purchase products after reviewing product information. Merchants often store product data, such as product descriptions, prices and pictures, in legacy relational databases. Online merchant systems, therefore, have to interface with merchant databases to access and display product information. As each merchant organizes their product information differently, there is a large installed base of databases having a wide variety of database schemas for product information.

Available online merchant systems, such as eShop 1.0 and Netscape Merchant system, require that merchants organize their product information according to a predefined database schema. Hence, to use such systems, a merchant must either convert its existing databases to this predefined schema or the merchant must create a new database having the predefined schema. For many merchants, conversion of their existing databases is not feasible. For example, the merchant may have several hundred thousand product entries located in different remote databases accessed by legacy applications, such as a point of sale system or an inventory control system, specifically designed to interact with these different databases. If the merchant converted these databases to the predefined schemas, their legacy applications would no longer function properly. To protect their investment in legacy applications, merchants may have to copy their product data into a redundant database having the predefined schema. Otherwise, merchants may have to incur substantial costs to rewrite their legacy applications to support the predefined schema of the online merchant system. For these reasons, it is not cost-effective for a merchant to use applications requiring a predefined schema for existing relational databases. To enter the online merchant market, merchants require an online merchant system that will cooperatively function with existing database systems having a wide variety of schemas.

SUMMARY OF THE INVENTION

The present invention enables merchants to enter the online merchant market by providing an interface and a method to access data in existing database systems having a wide variety of schemas. This allows merchants to present, merchandise and sell products having many attributes and options without enforcing a fixed schema on the product data in the merchant's database. The present invention also provides for storage of database queries in the database to isolate applications that access the database from differences in schemas and data sublanguages. Furthermore, by storing queries as database data, changes to the database and differences in database query languages are transparent to applications using the database. Thus, a merchant does not have to modify its applications every time the merchant modifies the database. Similarly, the present invention accommodates a wide variety of merchant business rules through the use of an access object to return database queries. Access objects of the present invention provide a structure for an application to return data from a query that is independent of the schema of the database storing the returned data.

One aspect of the present invention includes a method of accessing data stored in a database comprising the steps of providing a name associated with a query, the query stored in the database, accessing the query from the database with the name, executing the query to produce an access object, and processing the access object to obtain a selected result.

Another aspect of the present invention includes a method of accessing data stored in a database comprising the steps of providing a query, executing the query to produce an access object, wherein the access object comprises a descriptor corresponding to data in the access object, and processing the access object to obtain a selected result.

Yet another aspect of the present invention includes an access object having data resulting from execution of a relational database query comprising a descriptor having column names and corresponding data types.

Yet another aspect of the present invention includes an interface for accessing data comprising an application having a query module to provide a query, a database module, in communication with a database, to receive the query from the query module, and an access object, wherein the access object is returned to the application and includes data resulting from execution of the query.

Yet another aspect of the present invention includes a method of retrieving a data element from an access object having data resulting from execution of a relational database query comprising the steps of providing to the access object a row index corresponding to a row where the data element is located, providing to the access object a column name corresponding to a column in the row where the data element is located and retrieving the data element from the access object using the provided row index and the provided column name.

Lastly, another aspect of the present invention includes a method of retrieving a data element from an access object having data resulting from execution of a relational database query comprising the steps of providing to the access object a row index corresponding to a row where the data element is located, providing to the access object a column index corresponding to a column in the row where the data element is located and retrieving the data element from the access object using the provided row index and the provided column index.

BRIEF DESCRIPTION OF THE DRAWINGS

FIG. 3 is a query table having SQL queries and their corresponding query names illustrating an example of the query data portion of the database of FIG. 2.

FIG. 5a is a product table illustrating an example of the data portion of the database of FIG. 2.

FIG. 5b is an access object illustrating the results of a query on the product table of FIG. 5a.

FIG. 7 is a HTML file portion illustrating the processing an access object, the last step of the process flow shown in FIG. 1.

FIG. 8a is a department table illustrating department data referenced by the HTML file portion of FIG. 7.

FIG. 8b is an access object of FIG. 7 illustrating the results of a query on the department table of FIG. 8a.

FIG. 9a illustrates a schema for a database, as shown in FIG. 2, having information on music compact discs in a single product table.

FIG. 9b is an access object illustrating the results of a query on the product table of FIG. 9a.

FIG. 11 is an access object illustrating the results of a query on the product table and the price table of FIG. 10.

DETAILED DESCRIPTION OF THE PREFERRED EMBODIMENTS

The following detailed description of the preferred embodiments presents a description of certain specific embodiments to assist in understanding the claims. The following description is of a relational database storing a merchant's product information. The merchant accesses the database using ANSI standard SQL, described in *Understanding the New SQL: A Complete Guide,* by Jim Melton and Alan R. Simon, published by Morgan Kaufinann, 1993, hereby incorporated by reference. However, one may practice the present invention in a multitude of different embodiments as defined and covered by the claims.

Figure 1:
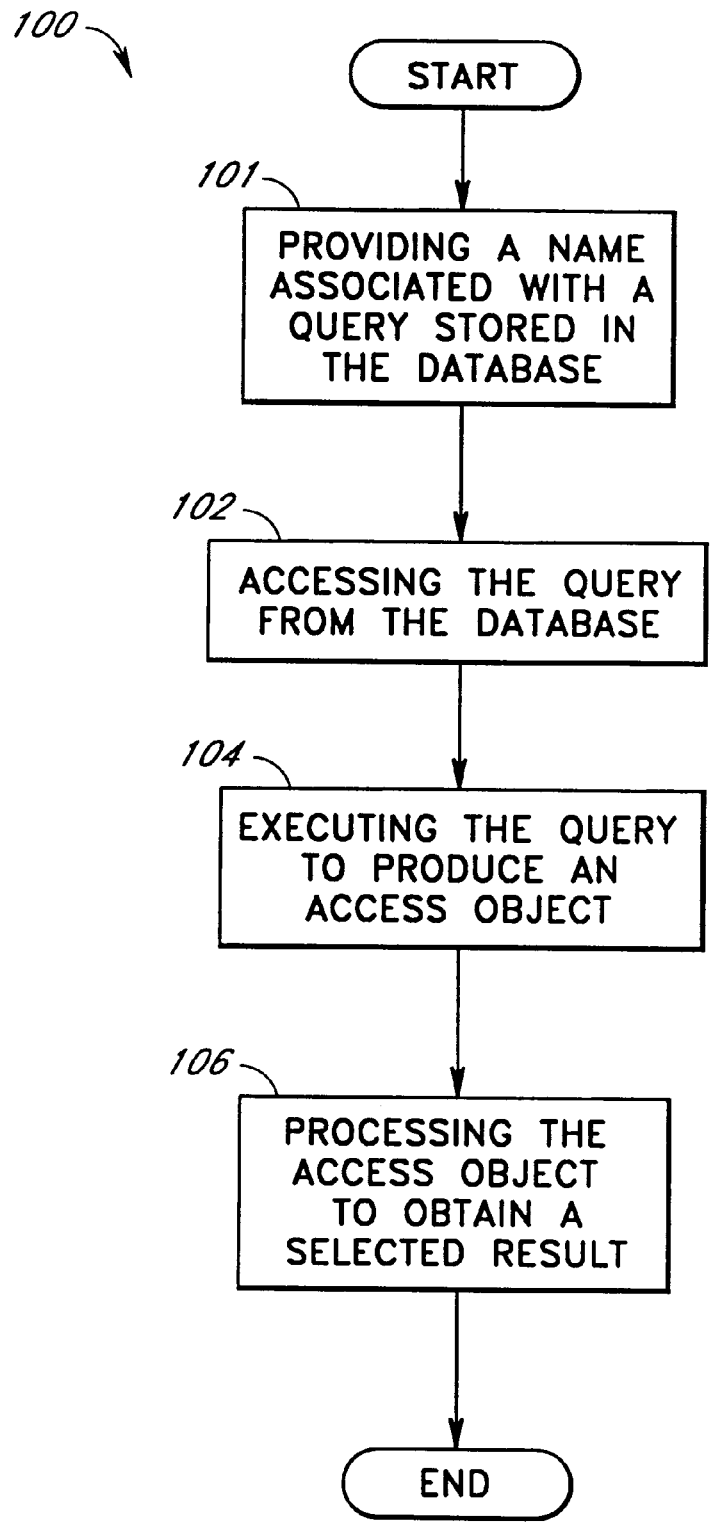
FIG. 1 is a flowchart illustrating the process flow for the present invention.
Figure 2:
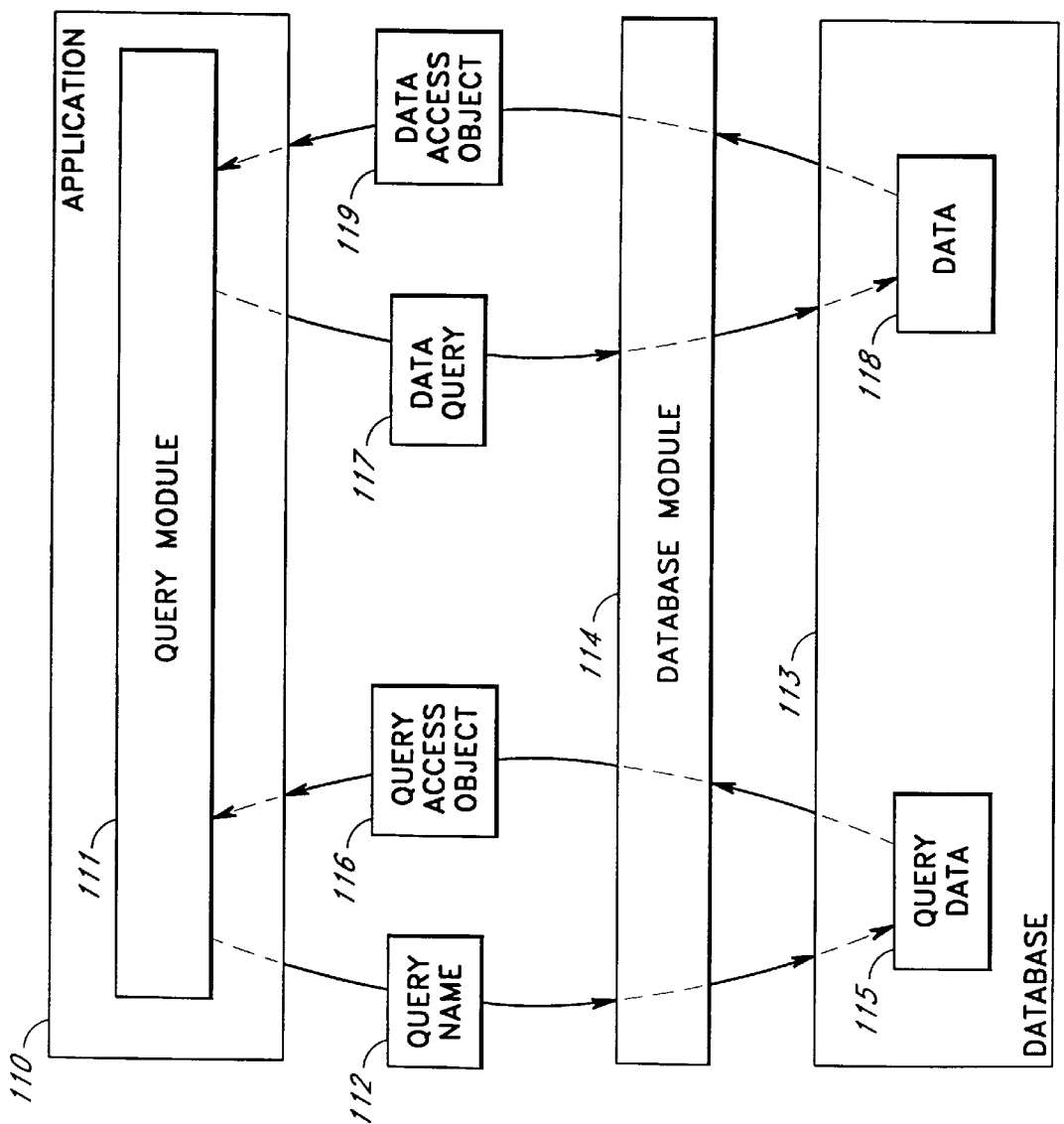
FIG. 2 is an interface illustrating the data flow between an application and a database corresponding to the process flow of FIG. 1.

FIG. 1 illustrates one method aspect of the present invention. In a preferred embodiment, an application, such as a program component of an online merchant system, provides a name 101 for a query stored in a database (FIG. 2). The database accesses the query 102 using the name provided by the application. The database next executes the query 104 to produce an access object having the query results. The following pseudo-code, written in the C Programming Language, implements an access object. First, the pseudo-code defines an access object data structure.

```
// This code is pseudo-code. It has not been compiled and makes some
// assumptions but demonstrates the concepts.
// Assuming that there is a data type to hold a list of opaque data pointers.
// This list is sometimes accessed as an array in the pseudo code below
// Assuming that there is a cached database connection to the appropriate
// data source
// There is no code for the freeing or releasing of data structures
// There is no error handling in this code
// Assuming that there is a simple database API to return data
// from queries.
// This is part of most database interfaces
// Declare an access object structure
typedef ao
{
    // Number of columns
    int columnCount;
    // Names and types of the columns returned
    list columnNames;
    list columnTypes;
    // Number of rows
    int rowCount;
    // List of lists for rows
    list rows;
} ao, * ao;
```

After defining the access object data structure, the code below implements a function, executeQuery, that receives and executes a SQL query and returns the query results in an access object.

```
// Define a function that will execute a query and return an access object
// An access object just collects query results from the database and stores
// it in a well-defined structure for access and manipulation.
ao * executeQuery (char * sql, list params, int paramCount)
{
    int i;
    ao * pAO;
    // Allocate an access object
    pAO = malloc ();
    // Pass in the parameters for the query to execute
    db.cursor.bind (params, paramCount);
    // Execute the query against the database
    db.cursor.execute (sql);
    // Get the number of columns
    pAO -> columnCount = db.cursor.columnCount ();
    // Create a descriptor having the column names and types
    pAO -> columnNames = CreateList (pAO -> columnCount);
    pAO -> columnTypes = CreateList (pAO -> columnCount);
    // Get the column types and datatypes
    for (i = 0; i < pAO -> columnCount; i++)
    {
        char * tempColumnName;
        int tempColumnType;
        tempColumnName = db.cursor.columnName (i);
        tempColumnType = db.cursor.columnType (i);
```

-continued

```
        ListInsert (pAO -> columnNames, tempColumnName, strlen
            (tempColumnName));
        ListInsert (pAO -> columnTypes, tempColumnType, size of
            (tempColumnType));
    }
    // Get the number of rows
    pAO -> rowCount = db.cursor.rowCount ();
    // Create the list of rows to hold the data returned by the query
    pAO -> colCount = ListCreate (pAO -> rowCount);
    // Now Get the rows of data
    for (i = 0; i < pAO -> rowCount; i++)
    {
        list row;
        // Create a list for the row and insert it into the row list
        row = CreateList (pAO -> columnCount);
        ListInsert (pAO -> rows, row, size of (row));
        // Build the data for the row
        for (j = 0; j < pAO -> columnCount; j++)
        {
            void * data;
            size_t size;
            data = db.cursor.data (i, j);
            size = db.cursor.size (i, j);
            ListInsert (row, data, size);
        }
    }
    return ao;
}
```

Data is retrieved from an access object by providing a row and column index or by providing a row index and a column name. For example, the following code defines functions, getIntByIndex and getIntByName, to retrieve integer data from an access object.

```
// Return an integer given a row and column by index
int getIntByIndex (ao *pAO, int row, int col)
{
    // Do a sanity check
    if (row > pAO -> rowCount || col > pAO -> colCount)
        return 0;
    // Get the data pointer
    data = pAO -> rows [row] [col];
    // Convert the data to the appropriate type. Note that more
    // database types can be recognized as needed
    if (pAO -> colTypes [col] == dbInt)
        return data;
    else if (pAO -> colTypes [col] == dbText)
        return = atol (data)
    else
        return 0
}
// Return an integer given a row and a name of a column
int getIntByName (ao *pAO, int row, char * name)
{
    col = ListFind (pAO -> colNames, name);
    return getIntByIndex (pAO, row, col);
}
```

Similarly, the code below defines functions, getTextByIndex and getTextByName, to retrieve character data from an access object. Note that one of ordinary skill may define additional functions to retrieve data of any data type from an access object in a similar manner.

```
// Return a string given a row and column in the ao
char * getTextByIndex (ao * pAO, int row, int col)
{
    void * data;
    char buf [255];
    char * pResult;
    // Start with an empty string
    pResult = buf;
```

-continued

```
    Ustrcpy (buf, "");
    // Sanity check
    if (row < pAO -> rowCount && col > pAO -> colCount)
    {
        data = pAO -> rows [row] [col];
        // Return appropriate data for the "cell". More database types
        // can be added as needed
        if (pAO -> colTypes [col] == dbText)
        {
            result = data;
        }
        else if (pAO -> colTypes [col] == dbInt)
        {
            sprintf (buf, "%d", data);
            result = buf;
        }
        else
        {
            strcpy (buf, "");
            result = buf;
        }
    }
    pResult = malloc ();
    strcpy (pResult, buf);
    return pResult;
}
// Return a string given a row and a column name
char * getTextByName (ao * pAO, int row, char * name)
{
    col = ListFind (pAO -> colNames, name);
    return getTextByIndex (pAO, row, col);
}
```

Finally, the code below implements a function, GetNamedQuery, that accepts a query name, retrieves a SQL query corresponding to the query name, executes the SQL query and returns the query results in an access object.

```
// This function will return an access object given a named query
ao * GetNamedQuery (char * name, char * query_table, list params)
{
    char * sql;
    list list;
    ao * result;
    // Formulate the query to get the actual query text
    sprintf (buf, "select query_name from %s where name = :1",
    query_table);
    // Store the name in a parameter list for the query
    list = ListCreate (1);
    ListInsert (list, name, strlen (name));
    // Execute the query for the query text
    pAO = executeQuery (buf, list);
    // Destroy the temp list
    ListDestroy (list);
    // Sanity check
    if (pAO -> rowCount 1 = 1 || pAO -> columnCount 1 = 1)
        return 0
    // Get the query text from the access object
    sql = getTextByIndex (pAO, 0, 0);
    // Execute the new query
    result = executeQuery (sql, params);
    // Destroy the temp access object
    AODestroy (pAO);
    // Return the result
    return result;
}
```

Referring back to FIG. 1, upon execution of the query, the application then processes the access object 106 to obtain a selected result. In one preferred embodiment, this flow 100, takes place on a server computer(s) providing a product retail service in an on-line network.

Storing queries in the database provides a level of indirection and flexibility that enables an application to access the database without prior knowledge of its schema. Thus, applications practicing the method of the present invention can access data in a wide variety of existing databases having different schemas and data sublanguages by simply modifying the queries stored in the databases. Moreover, modification of the database schema does not require corresponding modification or recompilation of the application accessing the database.

FIG. 2 illustrates the data flow of the present invention. An application 110 employs a query module 111 to submit a query name 112 to a database 113. A database module 114 passes the query name 112 to the database 113 to execute on a query data portion 115. In a preferred embodiment, the query data portion 115 comprises a query table in a relational database. The database 113 passes the data retrieved from the query name 112 to the database module 114 to form a query access object 116 to return to the query module 111. The application 110 processes the query access object 116 and submits a data query 117 to the database 113. In a similar manner, the database module 114 passes the data query 117 to the database 113 to execute on a data portion 118 to retrieve data for the database module 114 to produce a data access object 119 to return to the application 110 for further processing. In a preferred embodiment, the data portion 118 comprises a set of tables in a relational database. In this manner, the application 110 can access data from the database 113 without prior knowledge of its schema. In another preferred embodiment, the application 110 submits a data query 117 directly to the database 113 instead of accessing a query through a query name. The database 113 in turn executes the data query 117 to retrieve data for the database module 114 to produce a data access object 119 to return to the application 110 for further processing. If the data query produces no data, the access object 119 returned is a null access object.

As shown in FIG. 3, in a presently preferred embodiment, the database 113 includes a SQL query table 120 mapping a name to a data query 117 (FIG. 2). As shown in FIG. 3, the query table 120, stored in the query data 115 (FIG. 2), includes a query name column 122 and a SQL_Text column 124. The SQL_Text column 124 includes the text of a SQL query corresponding to a name in the name column 122. For example, the query "SELECT * FROM Products" 126 corresponds to the name "fetchproducts" 128 in query_table 120. When, for example, the query table 120 receives the name "fetchproducts", the appropriate SQL-Text in the row is returned to the database module 114 (FIG. 2).

Figure 4:
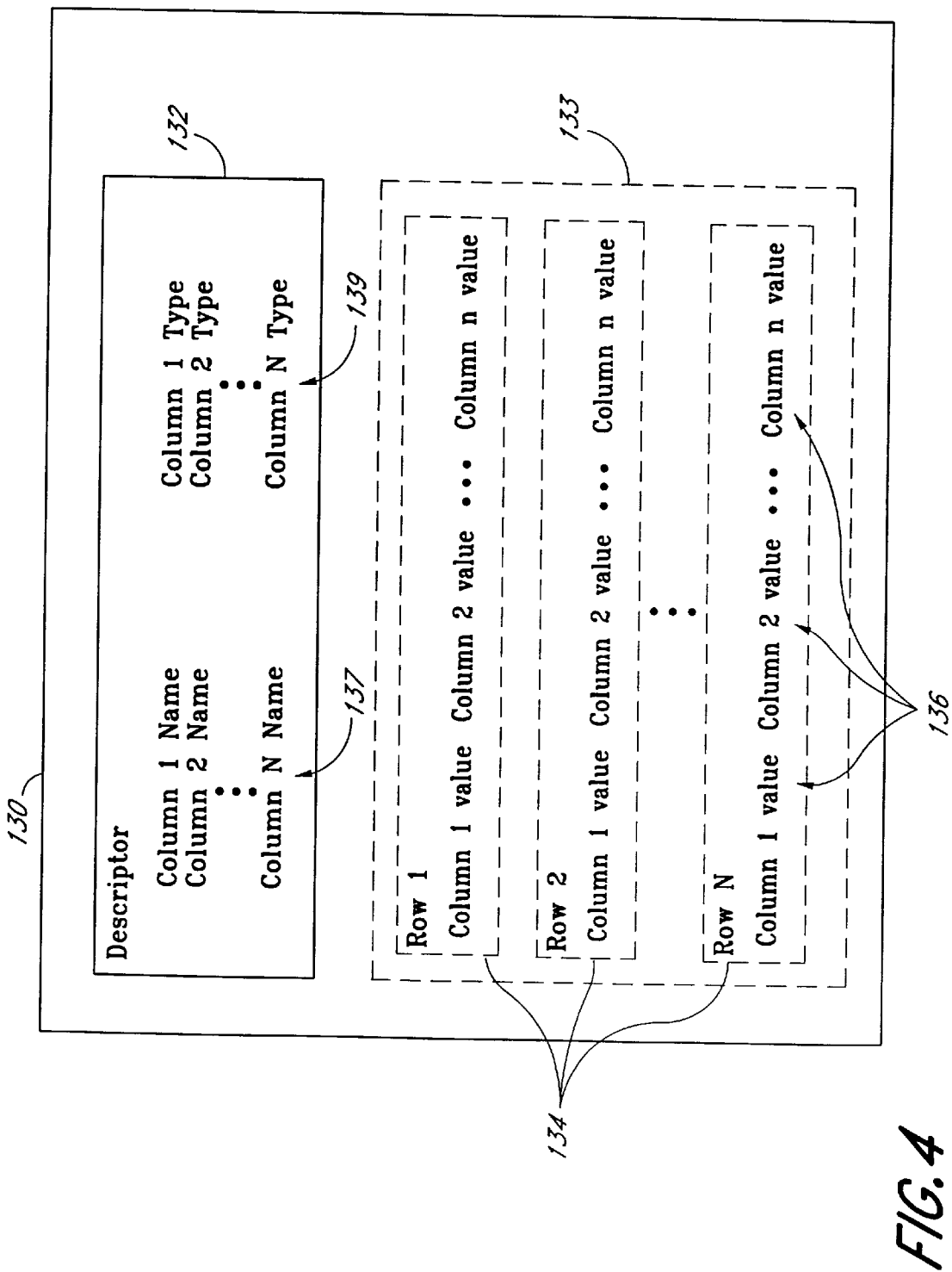
FIG. 4 is a block diagram illustrating the structure of an access object as shown in FIG. 2.

Referring now to FIG. 4, a block diagram illustrates the structure of an access object 130, such as the query access object 116 or the data access object 119 of FIG. 2. In a preferred embodiment, the access object 130 holds the results of a SQL database query. The access object 130 comprises a descriptor 132 and may include access data 133 returned by the query. When there is no data in the database corresponding to a query, the access object 130 returns no access data 133. Otherwise, the access object includes access data 133 having at least one row 134 including at least one column value 136. The descriptor 132 includes a pair of lists, one list having column names 137 and the other list having data types 139 corresponding to each column name in the first list. In a preferred embodiment, the database module 114 (FIG. 2) forms a descriptor 132 by using information the database 113 (FIG. 2) provides each time it executes a SQL query and by calling the relational DBMS functions to return rows of data from the data portion 118 (FIG. 2). In this manner, the database module 114 leverages the features and capability of SQL and the relational DBMS. For example, SQL permits aliasing of rows using different names. Thus, the SQL query "SELECT Amount List_Price, SKU FROM Product" permits an application to view the Amount column from the Product table using the alias name List_Price. Similarly, using built-in SQL functionality, a SQL query may perform calculations on data or return virtual rows. Thus, the SQL query "SELECT Amount* 100 List_Price FROM Product" multiplies the values in the Amount column by 100 and returns these values as a List_Price column in the access object.

Figures 5A, 5B:
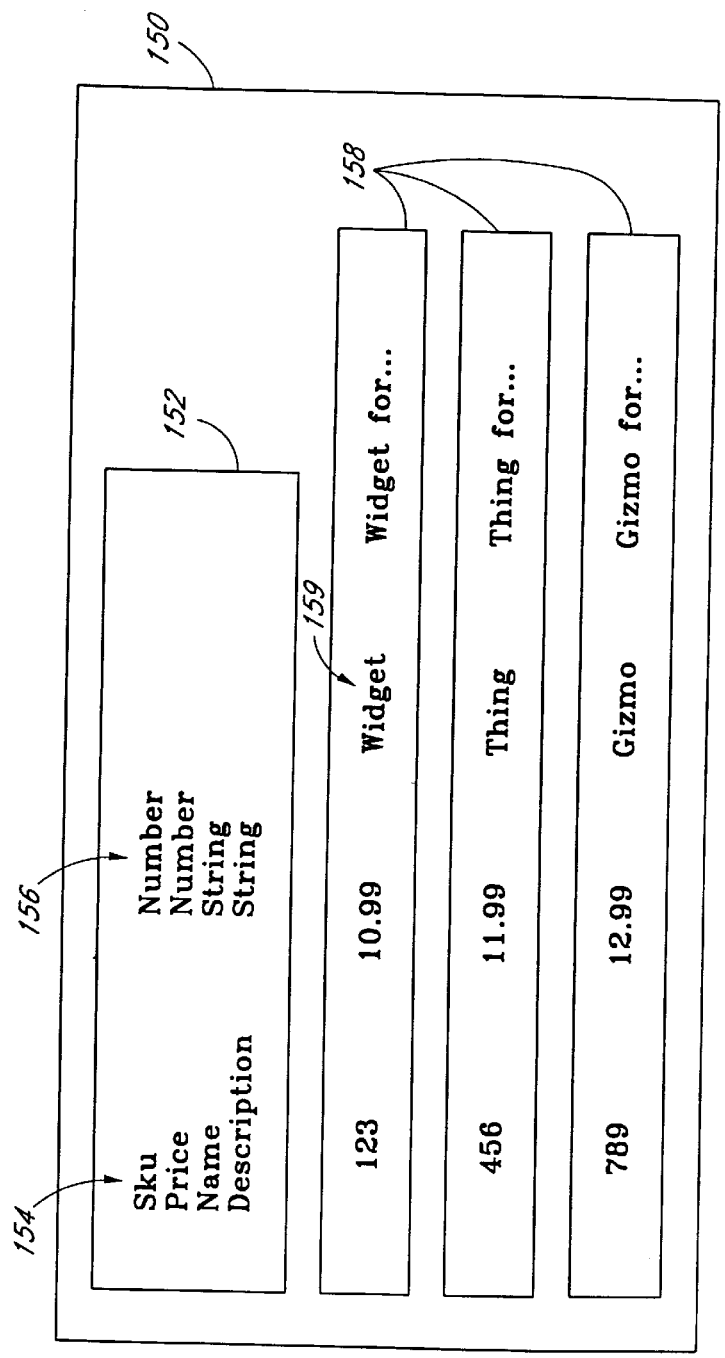

FIGS. 5a and 5b illustrate a product table 140 and an access object 150, named Sample, formed from a query on the product table 140. The Sample object 150 is a specific instance of the access object 130 of FIG. 4. Referring now to FIG. 5a, the product table 140 includes columns for a SKU 142, a price 144, a name 146 and a description 148. Note that the SKU 142 and price 144 columns include numerical data and the name 146 and description 148 columns include character strings. Referring now to FIG. 5b, the access object 150 results from execution of the SQL query "SELECT * FROM Products" 126 (FIG. 3). The descriptor 152 of the access object 150 includes a column name list 154 and its corresponding data type list 156. The column name list 154 includes the column names SKU 142, price 144, name 146 and description 148. As noted above, the data type column 156 includes numeric data for the SKU 142 and price 144 columns and string data for the name 146 and description 148 columns. Lastly, the access object 150 has three rows 158 which include the data in the respective rows 149 of the product table 140.

The application 110 (FIG. 2) processes an access object 150 to obtain desired results. In a preferred embodiment, the application 110 can reference a data element within an access object 150 by its row and column index. Thus, Sample [1] [3] refers to "Widget" 159, the data element at Row 1 and Column 3 of access object 150. In another preferred embodiment, the application can reference a data element within an access object 150 by its row index and a column name. Thus, Sample [1] ['Name'] also refers to "Widget" 159, the data element in Row 1 corresponding to the column labeled "Name". In another preferred embodiment, an online merchant system, such as shown in FIG. 6b, uses access objects to obtain and process product information.

Figure 6A:
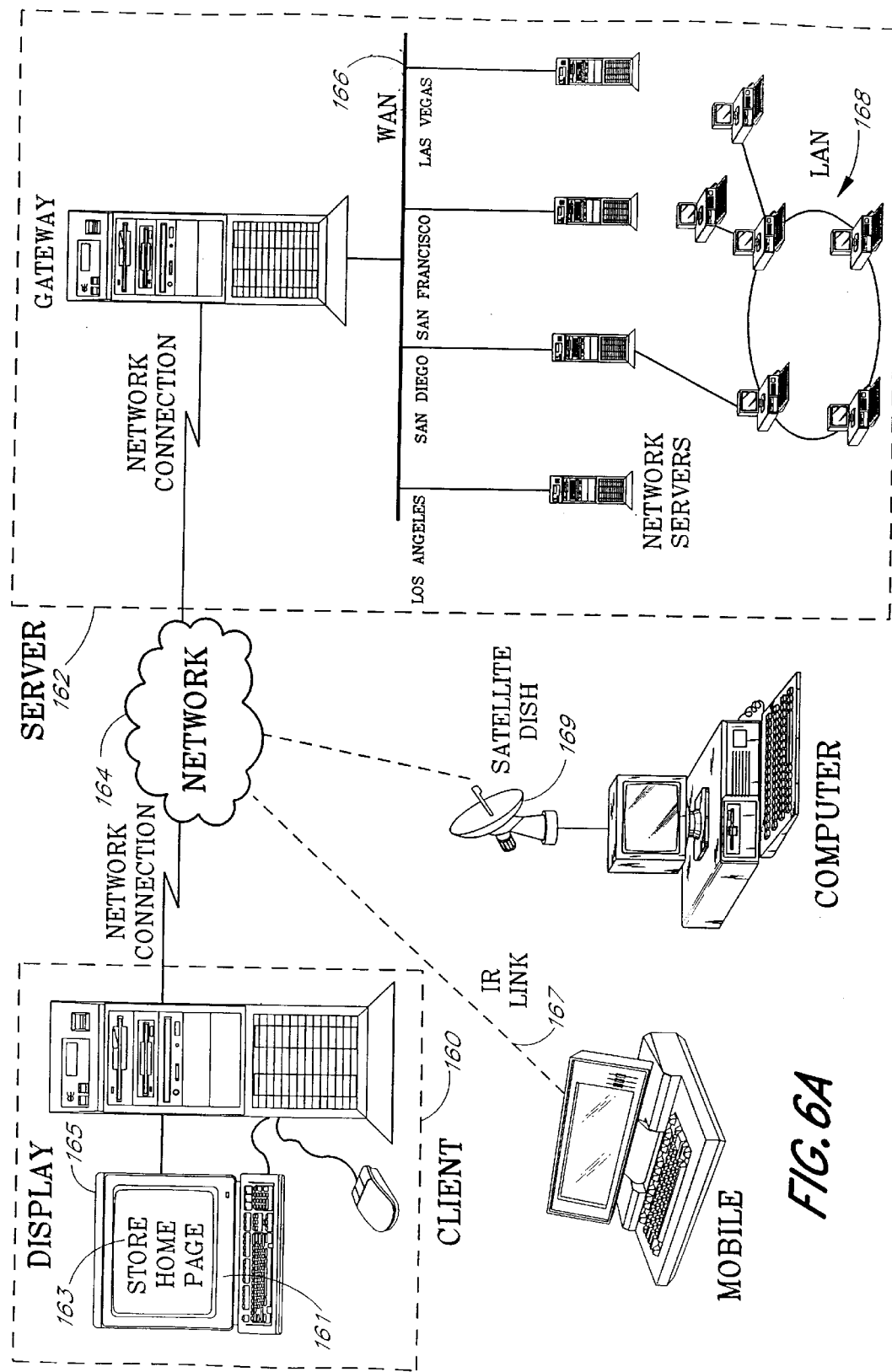
FIG. 6a is a block diagram illustrating an example of an online network for practicing the present invention.
Figure 6B:
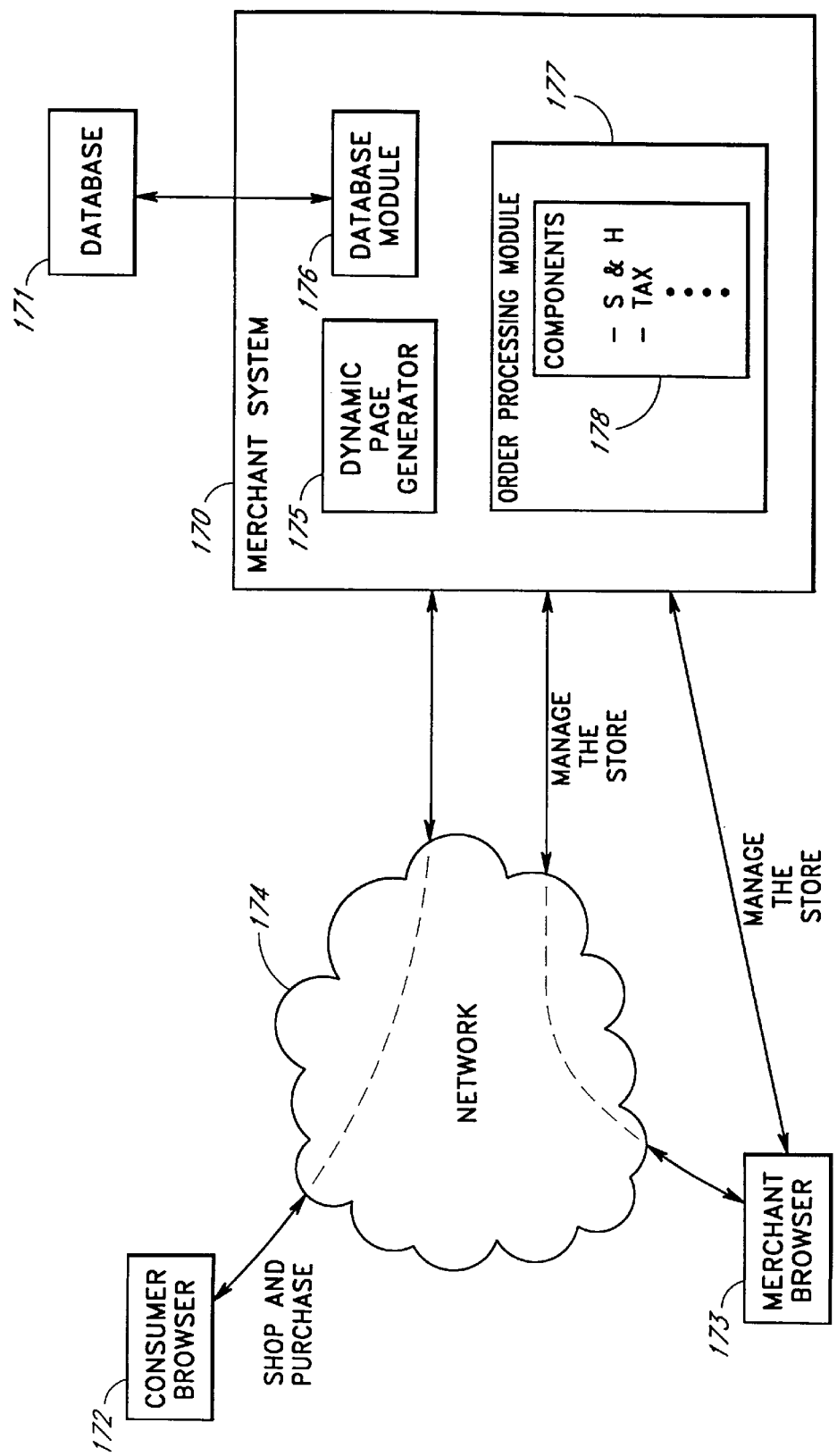
FIG. 6b is a block diagram illustrating an example of an online merchant system using the query module and database of FIG. 2.

FIG. 6a is an example of an online network for practicing the present invention. In particular, a client 160 communicates with a server 162 by means of a network 164, such as the World Wide Web portion of the Internet. The server 162 may include a gateway to a Wide Area Network (WAN) 166 having a plurality of Local Area Networks (LANs) 168. A browser 161, residing on the client 160, displays a store home page 163 from the World Wide Web on a viewing device 165. A user can view this page by entering, or selecting a link to, a Universal Resource Locator (URL), such as "www.store.com", in a browser program, such as Microsoft Explorer or Netscape Navigator, executing on the user's computer. Note that an online merchant system may reside in a server or in a combination of servers comprising the WAN 166. Similarly, the client 160 may access the network 164 through a wireless connection, such as the infrared link 167 or the satellite dish 169.

Focusing now on the network 164, the presently preferred network is the Internet. The structure of the Internet is well known to those of ordinary skill in the art and includes a network backbone with networks branching from the backbone. These branches, in turn, have networks branching from them, and so on. For a more detailed description of the structure and operation of the Internet, please refer to "The Internet Complete Reference," by Harley Hahn and Rick Stout, published by McGraw-Hill, 1994. However, one may practice the present invention on a wide variety of communication networks. For example, the network 164 can include interactive television networks, telephone networks, wireless data transmission systems, two-way cable systems, customized computer networks, interactive kiosk networks and automatic teller machine networks.

In addition, the network 164 includes online service providers, such as Microsoft Network, America OnLine, Prodigy and CompuServe. In a preferred embodiment, the online service provider is a computer system which provides Internet access to a client 160. Customers pay monthly access fees to the online service providers for help services and access to the Internet through local telephone connections. Of course, the online service providers are optional, and in some cases, the clients 160 may have direct access to the Internet 164. For example, the client 160 may be connected to a local area network 168 which in turn is directly connected to the Internet 164.

Focusing now on the client 160, the client is a general purpose computer. In a preferred embodiment, the client 160 is a conventional personal computer equipped with an operating system supporting Internet communication protocols, such as Microsoft Windows 95 and Microsoft Windows NT, a browser, such as Microsoft Explorer or Netscape Navigator, to access the Merchant System and a conventional modem for access to the Internet 164. In other embodiments, the client 160 could, for example, be a computer workstation, a local area network of computers, an interactive television, an interactive kiosk, a personal digital assistant, an interactive wireless communications device or the like which can interact with the network. While in such systems, the operating systems may differ, they will continue to provide the appropriate communications protocols needed to establish communication links with the network 164.

Referring now to FIG. 6b, a merchant system 170 communicates with a database 171, a consumer browser 172, a merchant browser 173, and a network 174. In a preferred embodiment, the database 171 comprises data stored locally in one or more storage devices, such as a magnetic disk drive or an optical disk drive. In another preferred embodiment, the database 171 comprises data distributed across a LAN 168 (FIG. 6a) or a WAN 166 (FIG. 6a). The database 121 may include query data, product information, order information, shopper information, store information, receipts and customer feedback data. A shopper uses a consumer browser 172, such as Microsoft Explorer or Netscape Navigator, communicating with a network 174, such as the World Wide Web portion of the Internet, to access a merchant's online store using the merchant system 170. Similarly, a merchant uses a merchant browser 173, such as Microsoft Explorer or Netscape Navigator, communicating with the merchant system 170 directly or through a network 174 to manage its online store. There are, of course, typically, a multiplicity of the browsers 172, 173 operating on the network 174 at any time.

The merchant system 170 includes a dynamic page generator 175, a database module 176 and an order processing module 177 having components 178 for various purposes. The dynamic page generator 175 communicates with the database module 176 to access data from the database 171 to format and display on the consumer browser 172 and the merchant browser 173. In a preferred embodiment, the dynamic page generator 175 and the database module communicate using a query name and an access object. In another preferred embodiment, the dynamic page generator 175 generates HTML for display on the browsers 172, 173.

In yet another preferred embodiment, the dynamic page generator 175 provides pages for integration with a merchant's legacy order processing system. Lastly, components 178 includes a plurality of application programs to enhance and administer the merchant system 170. For example, the components 178 can include applications to interface with commercial banking systems, to calculate shipping/handling, to determine applicable taxes and to post payments to various bank accounts. The order processing module 177 communicates with the dynamic page generator 175, the database module 176 and external systems, such as banks, to provide product information to online shoppers and to process their purchasing transactions.

To use an access object, a dynamic page generator 176, such as available in Internet Information Server from Microsoft or Cold Fusion from Allaire, parses a HTML file to create a Web page. FIG. 7 illustrates a portion of a HTML file 180 for a dynamic page generator 176 in the online merchant system 170 of FIG. 6b. The HTML file 180 includes words enclosed in square brackets, indicative of a directive. Directives take the form [directive args], where directive is the name of the directive and args are arguments for the directive. Directives indicate an operation to perform, such as providing and formatting text or the contents of a file, at that point in the HTML page. For example, in the syntax of the tfetchrows directive, the first argument, dao, provides the name of an access object. The second argument, Dept, identifies a table name for tfetchrows to use in the execution of a database query. Thus, the directive [tfetchrows dao Dept] 182 causes the database to execute the query "SELECT * FROM Dept" to form an access object dao having the query results. Note that using the tfetchrows directive is another example of accessing a query using a name. Similarly, suppose that a query table in the database included a query name "Foo" corresponding to a SQL query "SELECT * FROM Dept". In this instance, the directive [fetchrows dao Foo] would produce an access object dao having the same results as the directive [tfetchrows dao Dept] 182 described above. In contrast to the tfetchrows directive, the fetchrows directive retrieves and executes the SQL query corresponding to the name "Foo" and returns the query results in the access object dao.

Referring now to FIG. 8a, a Dept table 190 includes a name column 192, a description column 194 and a department ID column 196. As shown in FIG. 8b, the access object dao 198, an instance of the access object 130 (FIG. 4), results from execution of the tfetchrows directive. In another preferred embodiment, the access object dao 198 may result from execution of a directive specifying a query in the query table. Referring back to FIG. 7, the directive [eachrow dao] 184 instructs the dynamic page generator to iterate through the rows of the access object dao, one row at a time. The [/eachrow] 186 directive denotes the end of an iteration of the eachrow loop. As shown in FIG. 8b, the dao access object 198 includes three rows 199, so the eachrow loop completes three iterations. Referring back to FIG. 7, the directive [value dao.name] 188 directive references data in the access object 198 by the row index and column name, dao[rownumber][name], where rownumber is the current row being iterated. As noted above, the argument of the value directive provides a name to access the department name in a row of access object 198 (FIG. 8b). Thus, in a preferred embodiment, the dynamic page generator 176 uses directives to select desired data from an access object 130 for display.

Figures 9A, 9B:
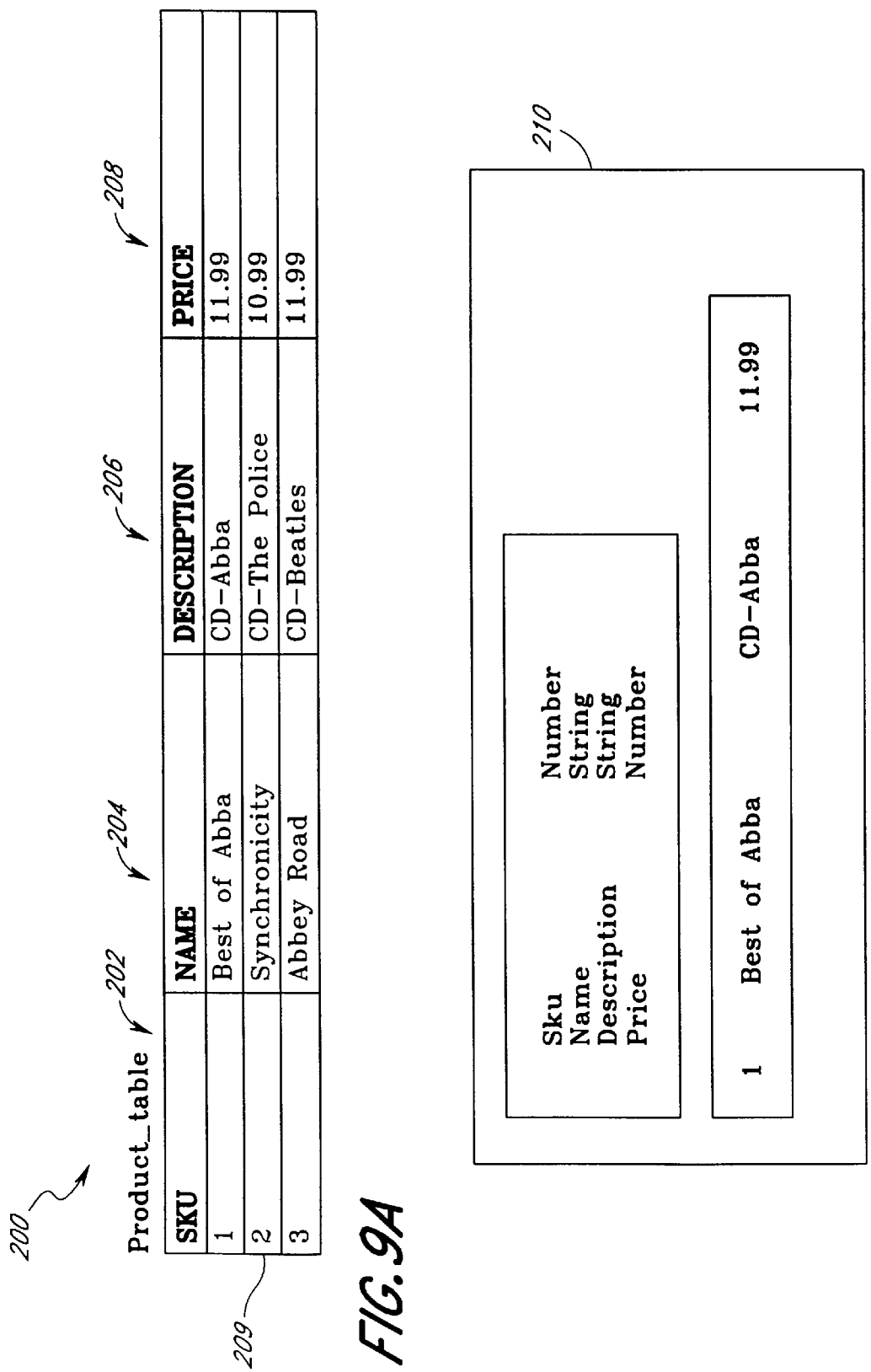

In an online merchant system, access objects facilitate retrieval and use of product information from multiple databases having different schemas. FIG. 9a illustrates a schema for a database having information on music compact discs (CDs). The schema comprises a product table 200 having columns for a product identifier 202, name 204, description 206 and price 208. The product table 200 is a specific instance of the data portion 118 of FIG. 2. Each row of the product table 200 corresponds to a data record for a CD. For example, the second row 209 of the product table 200 corresponds to the data record for the Synchronicity CD. Merchants typically access product information through a product identifier, such as a SKU. For example, if a shopper decides to purchase the "Best of Abba" CD, the online merchant system having this schema creates and executes the SQL query "SELECT * FROM Product_table WHERE Sku=:1" to create a first access object 210 as shown in FIG. 9b. Note that the SQL query includes a numerical parameter for the SKU. The ":1" represents a parameter passed into the query at execute time. For example, a directive may provide a parameter identifying a specific SKU from which to provide information. Thus, in the Abba example above, one may create a directive [fetchrows dao "fetchoneproduct" 1] to pass the numerical parameter "1" into a "fetchoneproduct" query that results in the first access object 210 shown in FIG. 9b.

Figure 10:
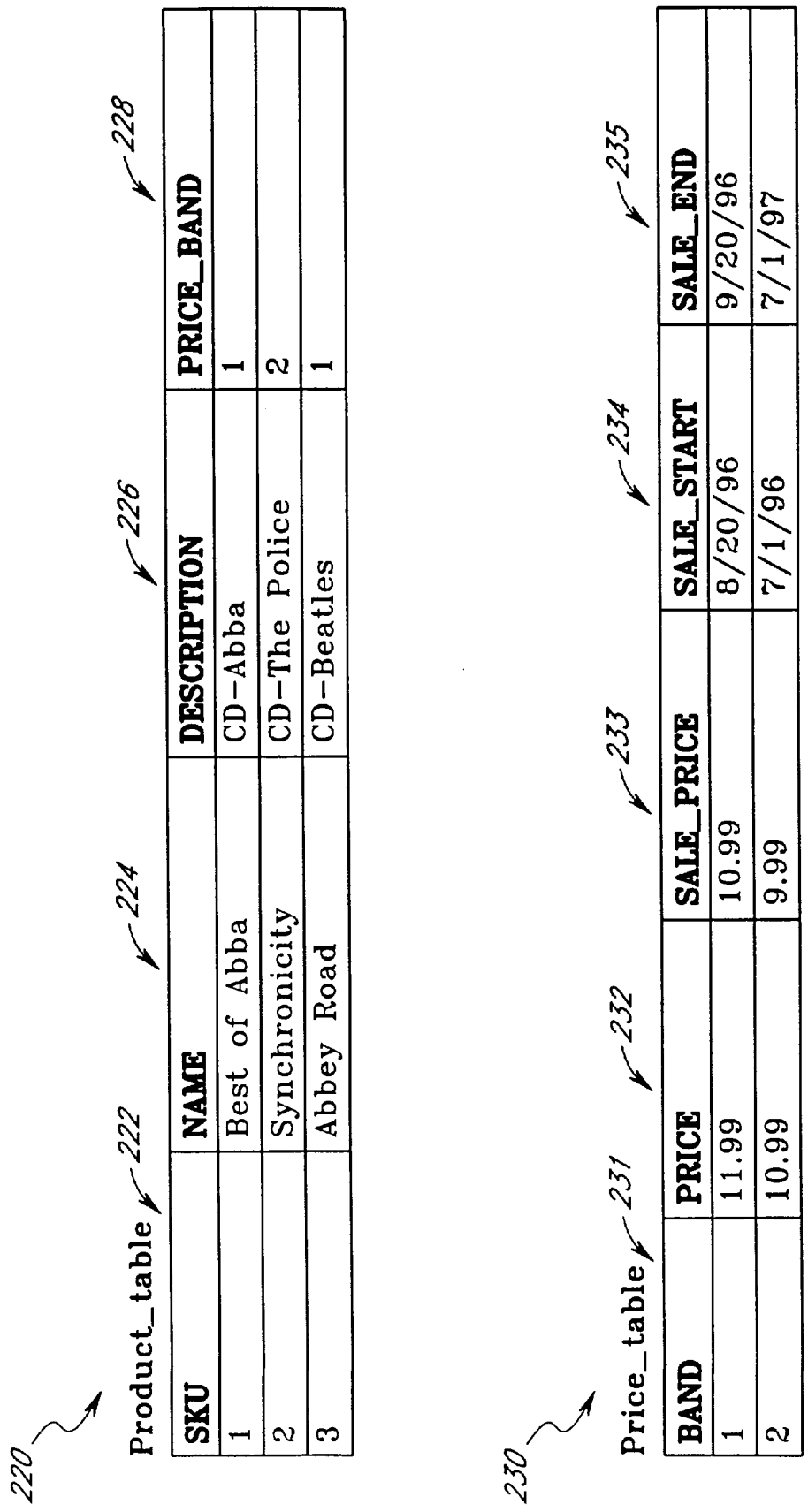
FIG. 10 illustrates a schema for a database, as shown in FIG. 2, having information on music compact discs in a product table and a price table.

FIG. 10 illustrates another schema for a database having information on music CDs. In contrast to a single table schema, the schema of FIG. 10 comprises a product table 220 and a price table 230. The product table 200 and the price table 230 are a specific instance of the data portion 118 of FIG. 2. The product table 220 includes columns for a product identifier 222, name 224, description 226 and price band 228. Each row of the product table 220 corresponds to a data record for an individual CD. The price table 230 includes columns for a price band 231, price 232, sale price 233, sale start date 234 and sale end date 235. Each row of the price table 230 corresponds to a data record having information on a price band. In this schema, the price band column 228 links product table 220 to price table 230 through its band column 231. As described above, the online merchant system having this schema creates and executes a different SQL query, "SELECT Sku, Name, Description, Price, Sale_Price, Sale_Start, Sale_End FROM Product_table, Price_table WHERE Sku=:1 and Product_table.price_band=Price_table.band", to create a second access object 240 as shown in FIG. 11.

Now, to calculate the price of an item for a shopper purchase, the order processing module 177 (FIG. 6b) requires a product price. Merchants often reference products using SKUs. Thus, a merchant system 170 includes queries to provide product prices given a SKU. In a preferred embodiment, the merchant system 170 accepts a parameter representing a SKU to generate a query on the database that returns an access object having information needed to calculate product prices. For example, as discussed above, the SQL query "SELECT * FROM Product_table WHERE Sku=:1" produces a first access object 210 (FIG. 9b) in a first schema (FIG. 9a). Similarly, the SQL query "SELECT Sku, Name, Description, Price, Sale_Price, Sale_Start, Sale_End FROM Product_table, Price_table WHERE Sku=:1 and Product_table.price_band=Price_table.band" produces a second access object 240 (FIG. 11) from a second schema (FIG. 10). Note that, in an access object ao, the order processing module 177 (FIG. 6b) can calculate a product price by referencing ao[1][4] or ao[1][price] in the first access object 210 (FIG. 9b) or the second access object 240 (FIG. 11). Thus, although the first access object 210 (FIG. 9b) and the second access object 240 (FIG. 11) are different, no modification of the order processing module 177 is needed to calculate a product price. Moreover, it is also possible to create the first access object 210 (FIG. 9b) from the schema of FIG. 10 by deleting the Sale_Price, Sale_Start, and Sale_End columns from the Price_table 230 (FIG. 10). In this manner, the present invention eliminates the effect of the schema used to store product information in a legacy database.

Referring back to FIG. 10, a more complex business rule provides for calculation of a sale price for an item. In this situation, the order processing module 177 (FIG. 6b) expects a query to produce three new data elements, Sale_start, Sale_end and Sale_price, for use in product price calculation. Note that the second access object 240 (FIG. 11) provides these elements. Thus, the present invention provides the flexibility to accommodate a wide variety of merchant business rules by including or modifying a query to return needed data elements in an access object for further calculations or processing.

The present invention advantageously overcomes several limitations of existing technologies and alternatives. Because merchants use different business rules to increase their profitability, merchants require flexibility in the design of their database schemas to adhere to their business rules and to maximize their profits. In contrast to the fixed schema approaches of existing online merchant systems, the method of the present invention allows merchants to present, merchandise and sell products having many attributes, such as size and color, as well as options, such as monograms, without enforcing a fixed schema on the product data in the database. Similarly, the present invention enables merchants to protect their investment in legacy merchant systems and applications by providing a mechanism that adapts to their existing database schemas. Moreover, the present invention provides a cost effective solution to merchants having existing databases as they can avoid substantial costs in converting their existing databases to a predefined schema.

By storing database queries as data within the database, the present invention makes changes to the database and differences in database query languages transparent to applications using the database. For example, a merchant can add columns having new product options or features to his product tables without affecting the online merchant system. In a presently preferred embodiment, the merchant system 120 accesses a single database to retrieve data. However, a merchant can use the same application to access multiple databases, each having a different schema and data sublanguage. For example, if a merchant has product data in a hierarchical mainframe database and in a personal relational database, an online merchant system can query both the mainframe and personal databases for product information even though they have different schemas and data sublanguages. The differences in data sublanguages and schemas are comprehended by the queries stored within the database. Thus, a merchant is free from having to modify its applications every time it modifies the database. Similarly, the present invention accommodates a wide variety of merchant business rules through the use of access objects to return database queries. Moreover, the present invention enables developers of online merchant systems to provide a multiplicity of application templates embedding a wide variety of directives to dynamically generate Web pages. Lastly, use of the present invention enables rapid development, prototyping and testing of network applications interacting with databases because developers can focus on improving the applications instead of debugging their interaction or communication with the database.

In addition, the present invention is useful for traditional database applications, such as the routine reporting and presentation of data. For example, the present invention is useful for preparing and displaying reports to merchants regarding online store visits (traffic) and usage patterns in a store. Moreover, the present invention is applicable to the display of any database data.

Those skilled in the art may practice the principles of the present invention in other specific forms without departing from its spirit or essential characteristics. Accordingly, the disclosed embodiments of the invention are merely illustrative and do not serve to limit the scope of the invention set forth in the following claims.

What is claimed is:

1. In an online shopping system that obtains product information from a legacy database having a predefined schema, a method of accessing desired product data from the legacy database, the method comprising:

associating a plurality of database queries with corresponding query names in a cross-reference;

obtaining a particular database query from the cross-reference that corresponds to a particular one of the query names;

submitting the particular database query to the legacy database from the online shopping system, wherein the legacy database returns a data table having one or more information records relating to different products;

wherein the database queries are formulated to return data tables that are formatted as required by the online shopping system rather than being formatted in accordance with the predefined schema of the legacy database;

processing the returned data table in the online shopping system to obtain the desired product data.

2. A method as recited in claim 1, wherein the cross-reference is stored in the legacy database.

3. A method as recited in claim 1, wherein the database queries are written in the SQL data sublanguage.

4. A method as recited in claim 1, wherein the processing step comprises indexing the returned data table with row and column identifiers.

5. A computer-readable storage medium containing instructions that implement an online shopping system, wherein the online shopping system obtains product information from a legacy database having a predefined schema, the instructions being executable by a computer to perform steps comprising:

associating a plurality of database queries with corresponding query names in a cross-reference;

obtaining a particular database query from the cross-reference that corresponds to a particular one of the query names;

submitting the particular database query to the legacy database from the online shopping system, wherein the legacy database returns an access object having a plurality of information records relating to different products;

wherein the database queries are formulated to return access objects whose information records are formatted as required by the online shopping system rather than being formatted in accordance with the predefined schema of the legacy database;

processing the returned access object in the online shopping system to obtain the desired product data.

6. A computer-readable storage medium as recited in claim 5, wherein the cross-reference is stored in the legacy database.

7. A computer-readable storage medium as recited in claim 5, wherein the database queries are written in the SQL data sublanguage.

8. A computer-readable storage medium as recited in claim 5, wherein each information record contains one or more fields, and wherein the processing step comprises indexing the returned access object with record and field identifiers.

9. An online shopping system comprising:

a server computer;

a legacy database accessible to the server computer, the legacy database having a predefined schema;

a cross-reference that associates a plurality of database queries with corresponding query names;

an application program that executes on the server computer to implement the online shopping system and to perform steps comprising:

obtaining a particular database query from the cross-reference that corresponds to a particular one of the query names;

submitting the particular database query to the legacy database from the online shopping system, wherein the legacy database returns a data table having one or more information records relating to different products;

wherein the database queries are formulated to data tables that are formatted as required by the online shopping system rather than being formatted in accordance with the predefined schema of the legacy database;

processing the returned data table in the online shopping system to obtain the desired product data.

10. An online shopping system as recited in claim 9, wherein the cross-reference is stored in the legacy database.

11. An online shopping system as recited in claim 9, wherein the database queries are written in the SQL data sublanguage.

12. An online shopping system as recited in claim 9, wherein the processing step comprises indexing the returned data table with row and column identifiers.

13. In an online shopping system that obtains product information from a legacy database having a predefined schema, a method of accessing desired product data from the legacy database, the method comprising:

submitting a database query to the legacy database from the online shopping system, wherein the legacy database returns an access object having one or more information records relating to different products;

wherein the database query is formulated to return an access object that is formatted as required by the online shopping system rather than being formatted in accordance with the predefined schema of the legacy database, the access object having records and fields;

processing the access object in the online shopping system to obtain the desired product data;

wherein the processing step comprises indexing the access object with record and field identifiers.

14. A method as recited in claim 13, wherein the database query is written in the SQL data sublanguage.

15. A method as recited in claim 13, wherein the access object comprises a table, and wherein the record and field identifiers comprise row and column identifiers.

16. A computer-readable storage medium containing instructions that implement an online shopping system, wherein the online shopping system obtains product information from a legacy database having a predefined schema, the instructions being executable by a computer to perform steps comprising:

submitting a database query to the legacy database from the online shopping system, wherein the legacy database returns an access object having one or more information records relating to different products;

wherein the database query is formulated to return an access object that is formatted as required by the online shopping system rather than being formatted in accordance with the predefined schema of the legacy database the access object having records and fields;

processing the access object in the online shopping system to obtain the desired product data;

wherein the processing step comprises indexing the access object with record and field identifiers.

17. A computer-readable storage medium as recited in claim 16, wherein the database query is written in the SQL data sublanguage.

18. A computer-readable storage medium as recited in claim 16, wherein the access object comprises a table, and wherein the record and field identifiers comprise row and column identifiers.

19. An online shopping system comprising:

a server computer;

a legacy database accessible to the server computer, the legacy database having a predefined schema;

an application program that executes on the server computer to implement the online shopping system and to perform steps comprising:

submitting a database query to the legacy database from the online shopping system, wherein the legacy database returns an access object having one or more information records relating to different products;

wherein the database query is formulated to return an access object that is formatted as required by the online shopping system rather than being formatted in accordance with the predefined schema of the legacy database, the access object having records and fields;

processing the access object in the online shopping system to obtain the desired product data;

wherein the processing step comprises indexing the access object with record and field identifiers.

20. An online shopping system as recited in claim 19, wherein the database query is written in the SQL data sublanguage.

21. An online shopping system as recited in claim 19, wherein the access object comprises a table, and wherein the record and field identifiers comprise row and column identifiers.

* * * * *